April 11, 1950      G. M. RICHARD      2,503,687
DEVICE FOR CLEANING MEAT TENDERIZING KNIVES
Filed Nov. 22, 1944
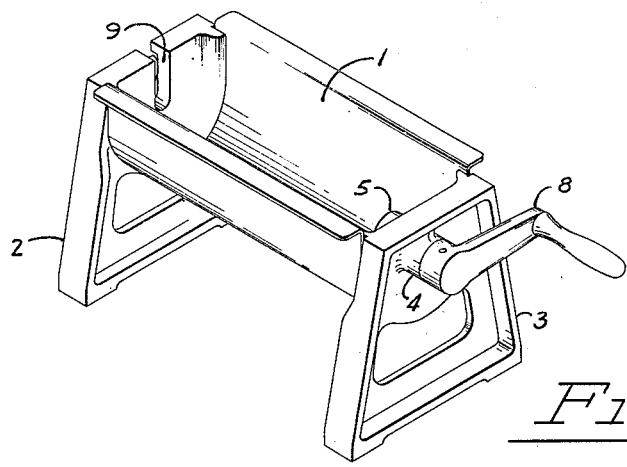
Fig. I
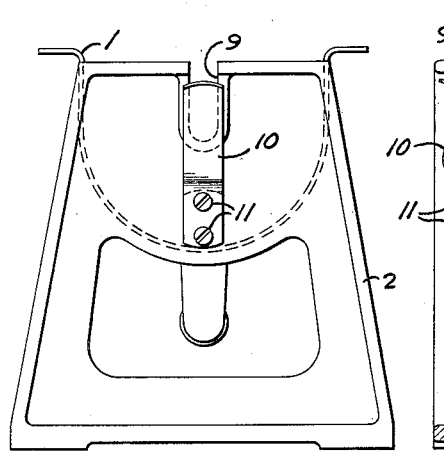
Fig. II
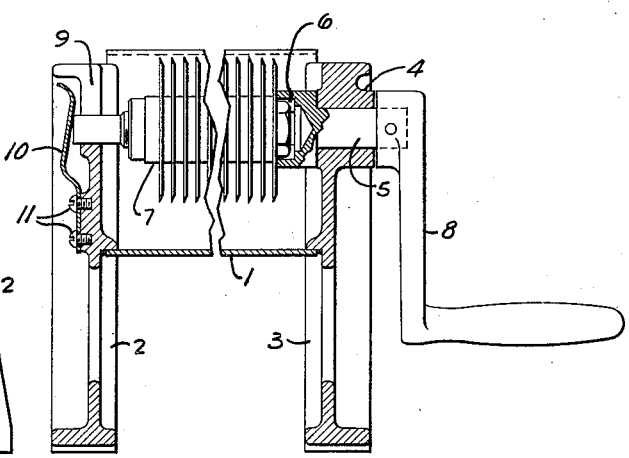
Fig. III
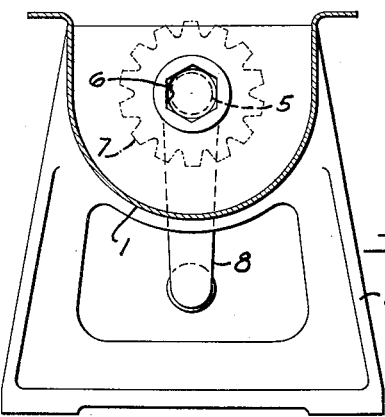
Fig. IV
INVENTOR.
Grant M. Richard
BY
Marshall & Marshall
ATTORNEYS Patented Apr. 11, 1950

2,503,687

UNITED STATES PATENT OFFICE 2,503,687

DEVICE FOR CLEANING MEAT TENDERIZING KNIVES

Grant M. Richard, Toledo, Ohio, assignor to Toledo Scale Company, Toledo, Ohio, a corporation of New Jersey Application November 22, 1944, Serial No. 564,601

2 Claims. (Cl. 134—149)

This invention relates to meat tenderizing machines and in particular to a device for facilitating the cleaning of the meat tenderizing machine knives.

In many meat tenderizing machines the meat to be tenderized is passed between a pair of parallel knife-carrying arbors, the arbors being spaced so that the knives slightly intermesh. To facilitate feeding the meat between the arbors the peripheries of the knives are serrated to form a plurality of teeth which not only cut the meat but also draw it through between the arbors. A pair of combs positioned with their teeth extending downwardly through the space between the knives and between the arbors provide a passage for the meat and prevent it from wrapping around either of the arbors. In the normal operation of this type of tenderizer, particularly when the meat is run through several times, small particles of meat are severed from the meat being tenderized and these particles collect on the combs and on the arbors between the knives. Furthermore sinews of the meat are occasionally caught on the teeth of the knives and are drawn through the spaces between the comb teeth. These sinews wrap tightly on the arbors and are difficult to remove. As it is impossible to satisfactorily clean the knives or to remove the sinews while the arbors are in the tenderizing machine the machines are made so that the arbors may be removed and cleaned manually. It is difficult to handle these knife-carrying arbors because of the great number of sharp edges presented by the knives and the danger of accidentally bending the knives.

The object of this invention is to provide a readily portable device which is adapted to hold a knife-carrying arbor of a tenderizing machine in such a position that it may be readily cleaned.

Another object is to provide a trough-like receptacle with means for holding and rotating a knife-carrying arbor with the knives partially submerged in a cleansing liquid.

These and other objects and advantages are attained in the structure shown in the drawings used to illustrate an embodiment of the invention.

In the drawings:

Figure I is a perspective view of a tenderizer knife washing machine.

Figure II is an end view of the washer.

Figure III is a vertical longitudinal section showing a tenderizer knife arbor in position in the washer.

Figure IV is a vertical transverse section of the washer.

These specific figures and the accompanying description are intended to merely disclose an embodiment of the invention and not to impose limitations on the claims.

According to the invention a frame is provided in one end of which means are provided to hold and rotate one end of an arbor of a meat tenderizing machine while the other end of the frame is adapted to support the other end of the arbor and maintain the arbor in engagement with the rotating means. The frame, in addition, may be provided with an integral liquid tight pan so that the knives may be partially submerged in a cleansing liquid. Alternatively, the frame may be constructed without the pan and may be used by immersing the frame and the arbor in a liquid contained in a larger receptacle.

A self-contained knife washing machine is shown in the drawings. The frame of this machine comprises a semi-cylindrical trough-shaped pan 1 carried on supporting brackets 2 and 3. The supporting brackets 2 and 3 also form the ends of the trough-shaped pan 1. One of the brackets is provided with a boss 4 which is drilled to provide a bearing for a shaft 5. A socket 6 formed in one end of the shaft 5 is similar to the driving socket of the tenderizing machine from which the arbor is taken. This socket is therefore adapted to support and rotatably drive a tenderizing machine arbor 7. The other end of the shaft 5 is provided with a crank 8 so that it may be manually rotated as may be required during the cleaning of an arbor. The other bracket 2 of the washing machine is provided with a vertical slot 9 whose lower end is in alignment with the shaft 5. The slot 9 is of such a width that it may serve as a bearing for the other end of the arbor being cleaned. A leaf spring 10 attached to the outer surface of the bracket 2 by means of a pair of screws 11 is adapted to press against the end of the arbor and thus hold its end engaged in the driving socket 6.

The meat tenderizer arbor to be cleaned is placed in position by first engaging one of its ends in the socket 6 and then pressing its other end into the slot 9 until it is engaged by the spring 10. If there are a number of sinews wound on the arbor they may be easily removed by using an ice pick or a similar sharp instrument between the knives of the arbor while the arbor is rotated by means of the crank 8 in such a direction as to unwind the sinews. After the sinews have been removed or substantially loosened a stiff brush, a scrub brush or equivalent, is pressed against the knives with its bristles extending into the space between the knives while the arbor is rotated to completely remove the remaining particles of meat. This cleansing operation may be facilitated by placing enough washing solution in the trough-shaped pan 1 to partially submerge the knives and the arbor. Thus, as the arbor is rotated and the brush is pressed against it the meat particles and sinew are loosened by the brush and are washed away by the liquid. The turned over edges of the trough-like pan 1 provide a convenient rest for guiding and holding a brush in position on the arbor.

By making the device portable it may conveniently be taken to a sink and held under a faucet for final rinsing of the knives.

In the preferred embodiment shown, the device is completely self-contained in that it has means for supporting and rotating the arbor and means for holding a liquid so that the knives of the arbor are partially submerged.

This device very materially simplifies the cleansing of a meat tenderizer arbor. This is an operation that should be done by the butcher at the close of each day's business and unless it is easy and convenient to do it is very likely to be slighted particularly inasmuch as the arbors are not visible to the customer. The use of this device takes most of the work out of the cleaning chore and also, by mechanically holding the arbor in position for cleaning, avoids the dangers inherent in attempting to clean the arbors when they are lying free on a table or in a sink. The operation of taking the arbors from the tenderizing machine, putting them into the washer, rotating them under the brush for a few seconds and rinsing them is a matter of a very few minutes.

Having described the invention, I claim:

1. In a device for cleaning the knives of meat tenderizing machines, in combination, a trough-like receptacle for holding a cleansing material, a shaft that is journaled in an end wall of said receptacle and that on its inwardly directed end has a socket to receive one end of a knife-carrying arbor, the other end wall of said receptacle having in alignment with the shaft a vertical open-end slot serving to journal the other end of the knife-carrying arbor, resilient means mounted on the outside of the end wall overlying the slot and adapted to bear angularly downwardly and axially against the end of the inserted arbor for holding the arbor engaged with the socket, and means for rotating the shaft.

2. In a device for cleaning the knives of meat tenderizing machines, in combination, a trough-like receptacle for holding a cleansing material, a shaft that is journaled in an end wall of said receptacle and that on its inwardly directed end has a socket to receive one end of a knife-carrying arbor, the other end wall of said receptacle having a vertical open-end slot therein in alignment with the shaft, said slot serving to journal the other end of the knife-carrying arbor, a spring mounted on the outside of said other end wall and overlying the slot, the spring being adapted to press angularly downwardly and axially against the end of the inserted arbor to hold the arbor in engagement with the socket of the shaft, and means for rotating said shaft.

GRANT M. RICHARD.

REFERENCES CITED

The following references are of record in the file of this patent:

UNITED STATES PATENTS

| Number | Name | Date |
|---|---|---|
| 977,872 | Hopkins | Dec. 6, 1910 |
| 988,606 | Voeck | Apr. 4, 1911 |
| 1,061,157 | Bemis | May 6, 1913 |
| 1,121,731 | Rimball | Dec. 22, 1914 |
| 1,548,655 | Braunschweig | Aug. 4, 1925 |
| 1,573,720 | Lampson | Feb. 16, 1926 |
| 1,631,095 | Hathaway | May 31, 1927 |